Jan. 8, 1957　　　W. C. PROUT ET AL　　　2,776,804
CORD DISPENSING DEVICE
Filed Nov. 9, 1955　　　　　　　　　　　　2 Sheets-Sheet 1
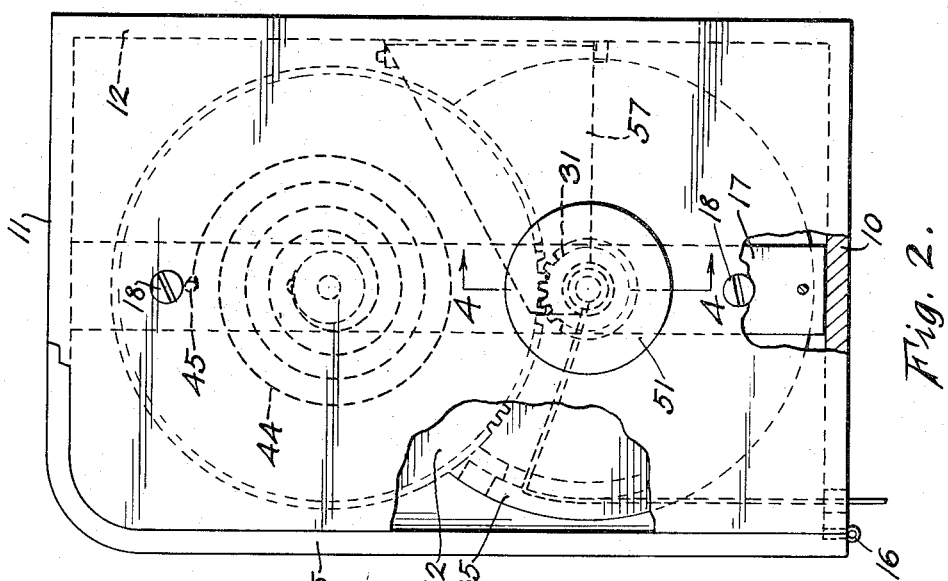
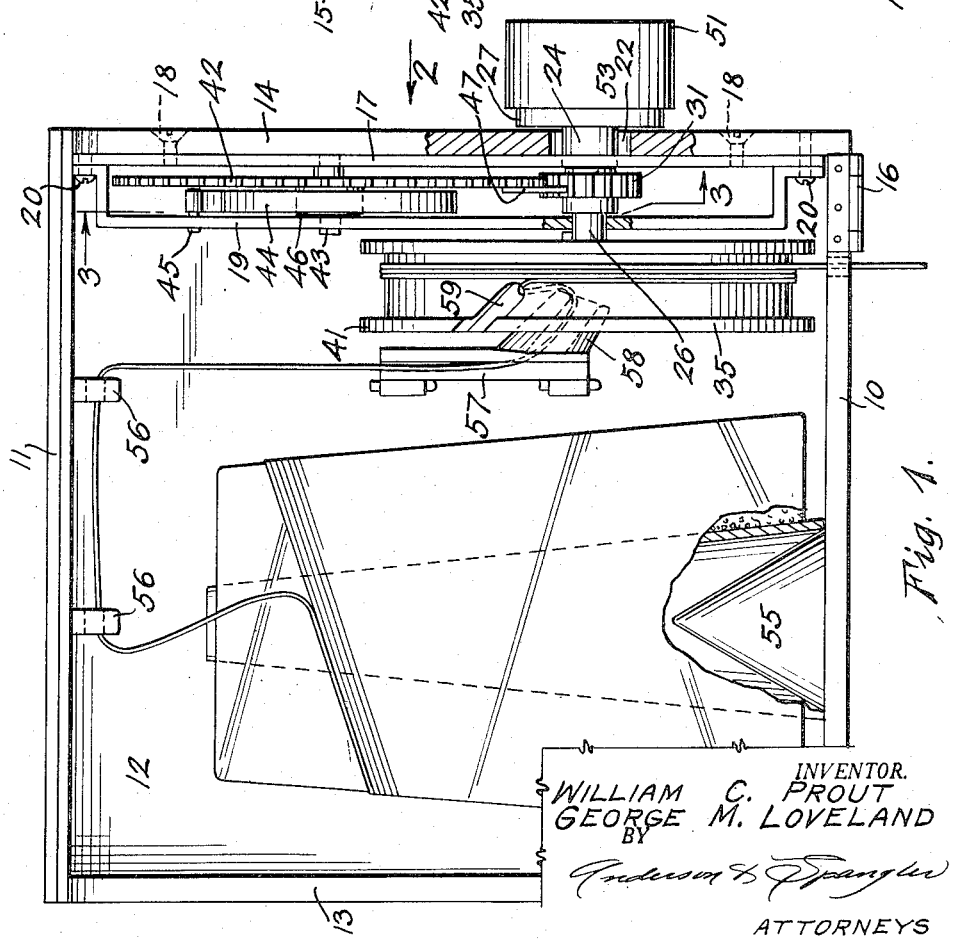
INVENTOR.
WILLIAM C. PROUT
GEORGE M. LOVELAND
BY
ATTORNEYS

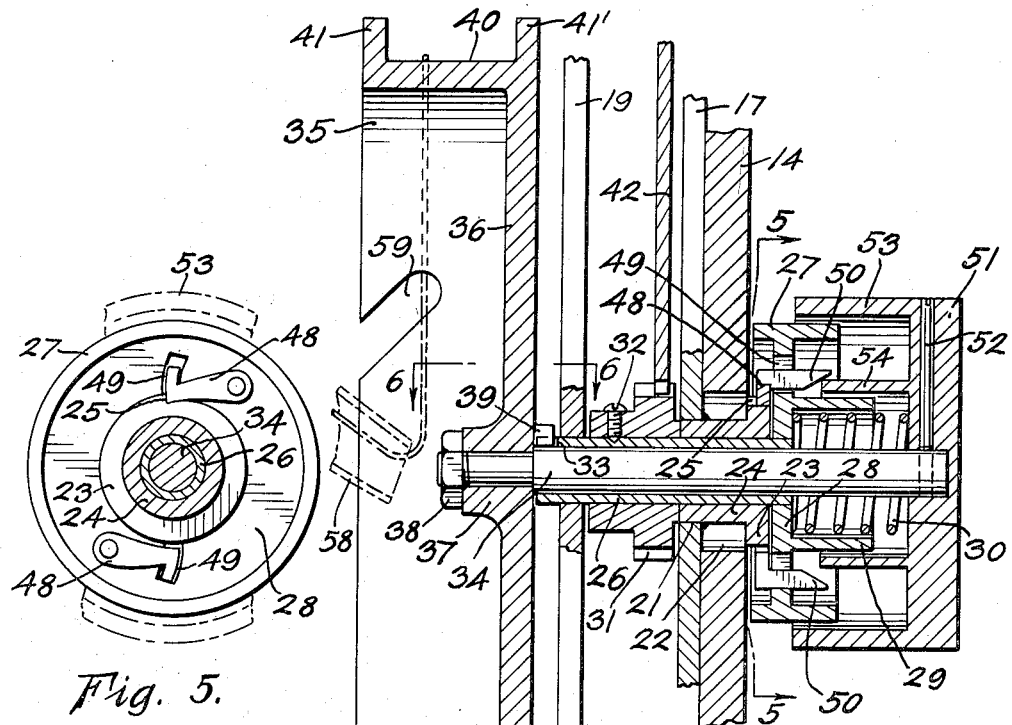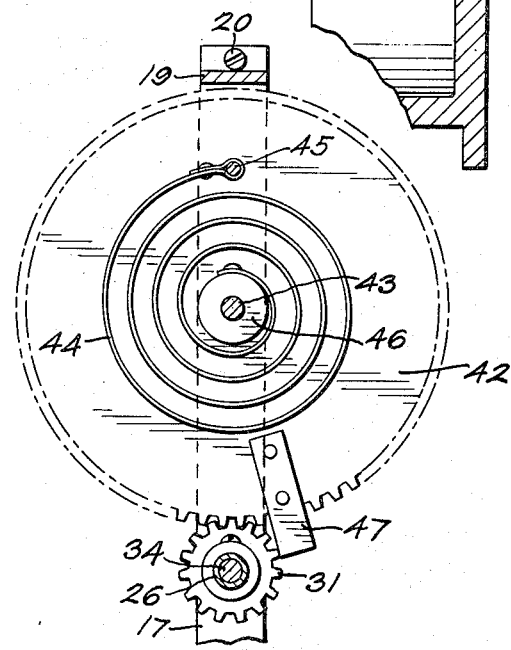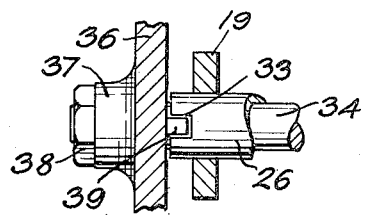

United States Patent Office 2,776,804
Patented Jan. 8, 1957

2,776,804

CORD DISPENSING DEVICE

William C. Prout and George M. Loveland, Denver, Colo.

Application November 9, 1955, Serial No. 545,861

2 Claims. (Cl. 242—145)

This invention relates to improvements in cord dispensing devices and has reference more particularly to a device for use in dispensing wrapping cord or twine such as is commonly used by meat retailers for wrapping meat.

This invention, although it is of general utility, will be described in its relation to the retail meat trade in connection with which it finds its greatest usefulness. Meats, especially fresh meats, are moist and the meat merchant's counters and his hands are frequently wet from coming in contact with the moist fresh meat. Where the wrapping cord or twine is dispensed in the usual way from balls, it frequently happens that long lengths are left on the bench or counter awaiting the wrapping and sewing of the next roll roast. Such lengths of cord get wet from the meat juices that cover the bench or counter and frequently pick up dust and other material particles that give them an unsanitary appearance. The use of such cords is objectionable and give the purchaser an unfavorable impression of the dealer's goods and methods.

It is the object of this invention to produce a cord dispenser of such construction that if more cord is removed than is actually used the dispenser will automatically wind this excess onto a spring actuated spool leaving only a short end projecting from the dispenser in convenient position to be grasped when more twine or cord is desired, and thus keep the cord clean and dry until it is used.

The above and any other objects that may become apparent as the description proceeds or to which attention may be called are attained by means of an arrangement and combination of parts that will now be described in detail for which purpose reference will be had to the accompanying drawings, in which:

Figure 1 is a front elevational view looking towards the left in Figure 2 with the door removed;

Figure 2 is a side elevational view looking in the direction of arrow 2 in Figure 1;

Figure 3 is a view, partly in section, looking through plane 3—3 Figure 1;

Figure 4 is a section to an enlarged scale, taken on line 4—4 Figure 2;

Figure 5 is a view, partly in section, taken on line 4—4 Figure 2; and,

Figure 6 is a view, partly in section, taken on line 6—6 Figure 4.

Referring now to the drawings, reference numeral 10 designates the bottom of a housing having a top 11, a back 12, and sides 13 and 14, and a door 15 that is connected with the bottom by hinges 16. The top of the door turns rearwardly as shown and forms a portion of the top. The mechanism to which this invention relates, comprises a frame formed by a flat straight steel bar 17 that is attached to the inside of end 14 by means of screws 18 and a similar bar 19 whose ends are bent into the shape shown in Figure 1 and attached to bar 17 by screws 20. Member 17 has an opening 21 which is concentric with a larger opening 22 in end wall 14. A ratchet wheel or disk 23 has an elongated hub 24 that has a pressed fit with the wall of opening 21. The peripheral edge of disk 23 has a ratchet notch 25 (Figure 5). Journaled in hub 24 and in a bearing in frame member 19 is a tubular shaft 26 to the outer end of which is non-rotatably attached a short cylindrical member whose peripheral wall has been designated by numeral 27, that extends to both sides of the circular central portion 28. A cylindrical concentric wall 29 projects outwardly from the central portion and forms therewith a cup for positioning spring 30, whose function will be described hereinafter. Attached to the hollow shaft adjacent the frame member 17 is a spur-gear pinion 31 that has been shown as held in place by a screw 32. Journaled in the hollow shaft, which, as shown in Figure 6, is provided at its inner end with a radial notch 33, is a solid shaft 34 to the inner end of which spool 35 is attached. The spool has a single circular wall 36 that is provided with a central hub 37. The inner end of shaft 34 has a short section of reduced diameter that extends through the hub and is threaded for the reception of nut 38. The spool has a projection 39 that engages in notch 33 to prevent the spool from turning relative to shaft 26. The spool has a flat peripheral surface 40 positioned between the two flanges 41 and 41'. A large spur-gear 42 is mounted for rotation about pivot 43 and is in mesh at all times with pinion 31. In the actual construction the diameter of gear 42 is six times the diameter of the pinion and the circumference of the peripheral surface of the spur gear is approximately twelve inches, and for the purpose of this description it will be considered that the reel or spool will turn six times for each revolution of gear 42. A spiral clock spring 44 has its outer end anchored to frame member 19 by a pin 45 and its inner end anchored to the hub 46 of gear 42 (see Figure 3) and, therefore, when the spring is under tension it tends to turn gear 42 clockwise and will normally hold the gear so that stop 47 will contact the pinion. Spring 44 is under considerable tension at all times when it is in the position shown in Figure 3 and the tension will increase as it turns counter-clockwise and stop 47 limits the turning of this gear to slightly less than 360 degrees. From Figures 4 and 5 it will be seen that part 28 has two pivoted pawls 48 and has corresponding openings 49 through which cams 50 extend as shown most clearly in Figure 4. Attached to the outer end of shaft 34 is a dish-shaped knob 51 that is held from rotation thereon by a long screw 52 or by other equivalent means. Knob 51 has a cylindrical rim 53 that laps rim 27 as shown in Figure 4 and in addition it has a cylindrical wall 54 that laps the smaller cylindrical wall 29. The diameter of wall 54 is such that when it is pushed inwardly it engages the inclined surface of pawls 49 and moves them outwardly and out of engagement with notch 25, which is always positioned at the top as shown in Figure 5. When the pawls are moved out of engagement with the notch, spring 44 moves gear 42 to the position shown in Figure 3 and maintains it under tension while the spool is turned to wind the cord thereonto.

*Operation*

A frusto-conical ball of cord is put into position on cone 55 and the cord is threaded through the two eyelets 56 and thence passed down along the hinged shield 57 and through the tubular outlet 58 from whence the cord is introduced into one of the notches 59 and brought to the outside of the spool. The cord is then passed through an opening in bottom 10. The operator now turns the spool in a counter-clockwise direction (Figure 2) and winds six complete turns onto the spool after which knob 53 is released and connects the spool to the tubular shaft as shown in Figure 6. The pawls are also released so as to be free to engage notch 25. When cord is desired the operator grasps the free end and pulls, thereby rotating the spool and pinion 31 in a direction to further tension spring 44 (counter-clockwise in Figure 3). When all of the cord has been unwound from the spool any further length of cord can be pulled out and will be fed directly from the ball. When the desired amount of cord has been withdrawn the tension on the cord is gradually released until one of the pawls engage notch 25 after which the cord can be cut. Sufficient cord should be left to make several turns about the spool. However, it is not necessary to leave a sufficient length to make six turns, but care should be taken to see that there is no cord left resting on the counter after the capacity of the spool has been filled. The spool operates in the same manner as the well known spring roller shade and can be stopped at any half revolution. When the pawl is released by a pull on the cord and the tension is then released the spool will continue to turn until stop 47 engages the pinion as shown in Figure 3. By slowing the rewind so that the centrifugal force will allow one of the pawls to drop into notch 25 the rewinding can be stopped at any desired point.

What is claimed as new is:

1. A cord dispensing device comprising in combination a frame, comprising a bar having an opening, a circular ratchet disk having a peripheral ratchet notch and an elongated tubular hub projecting from one side the end of which is secured in the opening by a pressed fit, a tubular shaft journaled in the hub, a circular disk attached to the outer end of said shaft, a pawl pivoted to the inner surface of said disk positioned to engage in the peripheral notch, the disk having an opening, the pawl having a cam member projecting outwardly through the opening, a gear pinion attached to said shaft adjacent the inside of the frame, a spur gear of larger diameter than the pinion rotatably mounted on a frame borne pivot, in meshed relation to the pinion, a spiral clock type spring having its inner end attached to the gear and its outer end attached to the frame, said spring being tensioned to turn the gear and pinion, a stop member projecting from the gear in position to engage the pinion and limit the turning of the gear to approximately one complete turn, the pawl being so related to the parts that when it engages the ratchet notch it will latch the tubular shaft against rotation, a center shaft journaled in the tubular shaft, a cup-like knob attached to the outer end of the center shaft, a spring interposed between the circular disk and said knob urging them apart, means comprising a cylindrical flange extending inwardly from the knob in position to engage the cam surface of the pawl and move it to unlatching position when the knob and center shaft is moved inwardly, a spool secured to the inner end of the center shaft in position to be urged into engagement with the inner end of the tubular shaft by the action of said spring, the spool and the inner end of the tubular shaft having a cooperating notch and projection for interconnecting them for conjoint rotation, the inner end of the spool having a coaxial opening to the interior thereof and an opening communicating the interior with the peripheral surface and means for guiding a cord to the axial opening, so that it may be wrapped about the spool in a direction to tension the spiral spring when it is unwound from the spool.

2. A string dispensing device comprising, a supporting structure, a frame attached to the structure which is provided with an opening, the frame having an opening in axial relation with the structure opening, a circular ratchet disk provided on its periphery with a ratchet notch and on one side with a tubular hub that extends through both openings and has a pressed fit with the opening in the frame, the disk portion projecting from the outer surface of the supporting structure, a tubular shaft journaled in the hub, said shaft projecting beyond the inner surface of the frame, a pinion secured to the tubular shaft adjacent the inner surface of the frame, a spur gear of larger size than the pinion mounted for rotation about a pivot carried by the frame, in operative relation with the pinion, a spiral spring operatively interconnecting the gear wheel with the frame to impart a torque force to the gear, a stop carried by the gear positioned to engage the pinion and limit the gear rotation to slightly less than one complete rotation, a central shaft journaled in the tubular shaft, projecting inwardly beyond the end of the tubular shaft, a spool carried by the end of the central shaft, cooperating means on the spool and on the inner end of the tubular shaft for releasably latching them, for conjoint rotation, a circular disk carried by the outer end of the tubular shaft, at least one pawl mounted for pivotation on the inner surface of said disk positioned to enter the ratchet notch on the periphery of the ratchet disk, said circular disk having at least one opening, the pawl having a cam member projecting through the opening, a cylindrical knob attached to the outer end of the central shaft, spring means positioned between the circular disk and the knob urging it and the central shaft outwardly, means comprising an inwardly extending cylindrical wall forming means for engaging the cam member for moving the pawl to inoperative position, and the inward movement of the central shaft serving to disengage the spool from the tubular shaft, the inner surface of the spool having an opening in communication with the outer surface of the spool so that a cord may be passed from the center of the spool to the periphery thereof and coiled thereabout.

References Cited in the file of this patent
UNITED STATES PATENTS
877,718    Kelly _____ Jan. 28, 1908